United States Patent
Chen et al.

(10) Patent No.: US 9,079,127 B2
(45) Date of Patent: Jul. 14, 2015

(54) ACOUSTICALLY DRIVEN NANOPARTICLE CONCENTRATOR

(75) Inventors: Sung-Wei Chen, Mount Sophia (SG); Eduardo Vom, Victoria (AU); Samuel Ross Garland Lanyon, Victoria (AU); Stuart Elliott, Victoria (AU); Richard Allman, Victoria (AU)

(73) Assignee: Empire Technology Development LLC, Wilmington, DE (US)

( * ) Notice: Subject to any disclaimer, the term of this patent is extended or adjusted under 35 U.S.C. 154(b) by 267 days.

(21) Appl. No.: 13/140,328

(22) PCT Filed: Jun. 4, 2010

(86) PCT No.: PCT/SG2010/000213
§ 371 (c)(1),
(2), (4) Date: Jun. 16, 2011

(87) PCT Pub. No.: WO2011/152796
PCT Pub. Date: Dec. 8, 2011

(65) Prior Publication Data
US 2012/0267288 A1    Oct. 25, 2012

(51) Int. Cl.
*B07B 7/04* (2006.01)
*B01D 21/28* (2006.01)
*B01D 43/00* (2006.01)

(52) U.S. Cl.
CPC .............. *B01D 21/283* (2013.01); *B01D 43/00* (2013.01)

(58) Field of Classification Search
CPC .... B01D 21/283; B01D 49/006; B01D 51/08; B01D 2259/816; B07B 7/00; B07B 7/04; B07B 7/06; B07B 2230/04

USPC ............. 209/18, 156, 210, 590, 20, 133–135, 209/142, 143; 210/748.01, 748.02
See application file for complete search history.

(56) References Cited

U.S. PATENT DOCUMENTS

| | | |
|---|---|---|
| 4,475,921 A | 10/1984 | Barmatz |
| 4,759,775 A | 7/1988 | Peterson et al. |
| 5,419,877 A | 5/1995 | Goforth et al. |
| 5,626,767 A | 5/1997 | Trampler et al. |
| 5,748,758 A | 5/1998 | Menasco, Jr. et al. |
| 5,902,489 A | 5/1999 | Yasuda et al. |
| 6,106,474 A | 8/2000 | Koger et al. |

(Continued)

FOREIGN PATENT DOCUMENTS

| | | |
|---|---|---|
| CN | 1037463 A | 11/1989 |
| EP | 1158671 B1 | 7/2009 |

(Continued)

OTHER PUBLICATIONS

International Search Report and Written Opinion, PCT/SG2010/000213, dated Jul. 26, 2010.

(Continued)

*Primary Examiner* — Stefanos Karmis
*Assistant Examiner* — Kalyanavenkateshware Kumar
(74) *Attorney, Agent, or Firm* — Pepper Hamilton LLP

(57) ABSTRACT

An apparatus including an acoustic transducer configured to acoustically associate with at least a portion of a fluid cavity. The fluid cavity is configured as a resonator. The acoustic transducer is configured to create an acoustic wave in the at least a portion of the fluid cavity. The acoustic wave is selected to increase the concentration of at least one particulate in a location in the fluid cavity.

25 Claims, 4 Drawing Sheets

(56) References Cited

U.S. PATENT DOCUMENTS

| | | | |
|---|---|---|---|
| 6,280,388 | B1 | 8/2001 | Koger et al. |
| 6,467,350 | B1 | 10/2002 | Kaduchak et al. |
| 6,475,151 | B2 | 11/2002 | Koger et al. |
| 6,603,241 | B1 | 8/2003 | Barber et al. |
| 6,644,118 | B2 | 11/2003 | Kaduchak et al. |
| 6,969,420 | B2 | 11/2005 | Chien et al. |
| 7,837,040 | B2 | 11/2010 | Ward et al. |
| 2001/0014775 | A1 | 8/2001 | Koger et al. |
| 2002/0162393 | A1 | 11/2002 | Kaduchak et al. |
| 2003/0015035 | A1 | 1/2003 | Kaduchak et al. |
| 2008/0245745 | A1 | 10/2008 | Ward et al. |
| 2011/0024335 | A1 | 2/2011 | Ward et al. |

FOREIGN PATENT DOCUMENTS

| | | |
|---|---|---|
| JP | H 06509406 A | 10/1994 |
| JP | 09122480 | 5/1997 |
| JP | H 09505512 A | 6/1997 |
| JP | 2002041052 A | 2/2002 |
| JP | 2008508520 A | 3/2008 |
| JP | 2008263588 | 10/2008 |
| WO | WO02/081048 A1 | 10/2002 |
| WO | WO2006/032048 A2 | 3/2006 |
| WO | WO2006/032048 A2 | 3/2006 |
| WO | WO2011/152796 A1 | 12/2011 |

OTHER PUBLICATIONS

Barmatz, et al., Acoustic radiation potential on a sphere in plane, cylindrical, and spherical standing wave fields, *J. Acoust. Soc. Am.* (Mar. 1985), 77(3):928-945.

Goddard, et al., Ultrasonic Particle-Concentration for Sheathless Focusing of Particles for Analysis in a Flow Cytometer, *Cytometry A.* (Feb. 2006), 69(2):66-74.

Goddard, et al., Analytical performance of an ultrasonic particle focusing flow cytometer, *Anal Chem.* (Nov. 15, 2007), 79(22):8740-8746.

Harris, et al., A dual frequency, ultrasonic, microengineered particle manipulator, *Ultrasonics* (Apr. 2004), 42(1-9):139-144.

Hill, et al., Modelling of layered resonators for ultrasonic separation, *Ultrasonics* (May 2002), 40(1-8): 385-392.

Townsend, et al., Performance of a quarter-wavelength particle concentrator, *Ultrasonics* (Nov. 2008), 48(6-7):515-520.

International Search Report and Written Opinion for PCT/US2012/037721 dated Aug. 16, 2012.

Aerogel, d.o.o., http://www.aerogel.si/english/1__kaj__so__aerogeli__en.htm (Printed from Internet Sep. 20, 2011).

Cabot Aerogel: Aerogel for Insulation, Daylighting, Additives—Cabor Corporation, http://www.cabot.corp.com/Aerogel (Printed from Internet Sep. 15, 2012).

Pierre et al., Chemistry of Aerogels and Their Applications, *Chem. Rev.* (2002), 102:4243-4265.

Aerogel Suppliers, My list of aerogel suppliers, accessed at http://web.archive.org/web/20090526235556/http://p25ext.lanl.gov/~hubert/aerogel/agel__suppliers.html, accessed on Aug. 26, 2014, pp. 1-3.

Airglass, What is Airglass?, accessed at http://web.archive.org/web/20100315064843/http://www.airglass.se/, accessed on Aug. 26, 2014, pp. 1-2.

NanoPore Solutions for porous materials, accessed at http://web.archive.org/web/20090715224941/http://www.nanopore.com/, accessed on Aug. 26, 2014, p. 1.

Hunt et al., History of silica aerogels, accessed at http://web.archive.org/web/20070509011710/http://eande.lbl.gov/ECS/Aerogels/, accessed on Aug. 26, 2014, pp. 1-3.

ACOUSTICALLY DRIVEN NANOPARTICLE CONCENTRATOR

CROSS-REFERENCE TO RELATED APPLICATIONS

This application is a U.S. national stage filing under 35 U.S.C. §371 of International Application No. PCT/SG2010/000213 filed Jun 4, 2010 entitled "Acoustically Driven Nanoparticle Concentrator," the disclosure of which is incorporated by reference in its entirety.

BACKGROUND

The following description is provided to assist the understanding of the reader. None of the information provided or references cited is admitted to be prior art.

Nanoparticulate matter on the order of hundreds of nanometers or less from anthropomorphic and natural origins has increased dramatically with modern manufacturing, pervasive use of consumer electronics, and in medical applications. Traditionally, particulate is removed from a fluid using a physical filtering system. For example, in a heating-ventilation and air conditioning (HVAC) system, particulate can be removed using fiberglass or spunbound filters, charged plates, or ceramic beads that are interposed in the fluid flow. In liquid fluids, various mechanical filters can be used to remove particulate from a liquid. However, a physical filtering system restricts the flow of the fluid resulting in higher energy costs for moving the fluid and frequent maintenance. Additionally, a physical filtering system can become easily plugged.

There is an interest to use acoustic energy, particularly ultrasonic energy, to concentrate particles efficiently in liquid phase fluids. The concepts of ultrasonic energy in fluids can be applied to flow cytometry, microfluidics, and other liquid phase applications. Ultrasonic energy can be used to separate out micron-size biological molecules, such as cells, etc. using liquid filled cavities on the order of millimeters.

SUMMARY

An illustrative apparatus includes an acoustic transducer configured to acoustically associate with at least a portion of a fluid cavity. The fluid cavity is configured as a resonator. The acoustic transducer is configured to create an acoustic wave in the at least a portion of the fluid cavity. The acoustic wave is selected to increase the concentration of at least one particulate in a location in the fluid cavity.

An illustrative method includes forming an acoustic wave in at least a portion of a fluid cavity. The fluid cavity is configured as a resonator. The acoustic wave is selected to concentrate at least one particulate in the fluid cavity at a location in the fluid cavity. The acoustic wave resonates in the at least a portion of the fluid cavity.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE EMBODIMENTS

Figure 1:
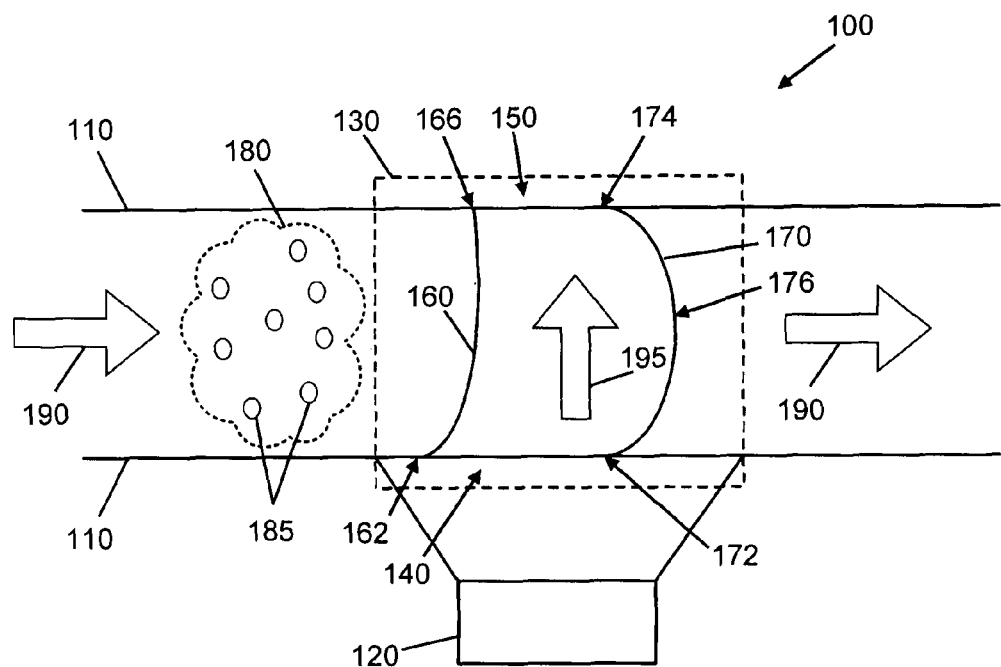
FIG. 1 is a schematic front view of an acoustic particle concentrator in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Described herein are illustrative systems, methods, computer-readable media, etc. for acoustic particle concentrators. Acoustic waves, for example, in a quarter wave resonant mode, are generated by a multi-layer resonance structure, such as a fluid cavity, and used to concentrate nanoparticle pollutants in flow structures. The acoustic waves can be generated by an acoustic transducer attached to a fluid cavity. These acoustic waves operate across a wide range of frequencies, but particularly within the audible range. Nanoparticles are collected in stream and may be diverted for analysis, remediation, sequestration, or other uses. Audible and near-audible acoustic signals may be used to acoustically drive the resonance, for example, in standard gas exhaust ducts.

Referring to FIG. 1, a schematic front view of an acoustic particle concentrator 100 in accordance with an illustrative embodiment is shown. The acoustic particle concentrator 100 includes a fluid cavity 110 and an acoustic transducer 120. The fluid cavity 110 can be any enclosure or partial enclosure that can at least partially or completely contain a fluid, such as, but not limited to, a gas. A fluid is a substance that continually deforms (flows) under an applied shear stress. Fluid can be a liquid, gas, or liquid and gas together. Examples of a liquid are water, glycol, oil, etc. Examples of a gas are air, nitrogen, vapor, etc. The fluid can be at any temperature, pressure, or density where it is still in a liquid or gas phase.

The fluid cavity 110 can be, for example, a duct, a pipe, a dedicated gas chamber, an enclosure, or a cyclone. For example, the fluid cavity 110 can be a HVAC duct. The fluid cavity 110 can be made of metal, plastic, or a fiber-based material. For example, the fluid cavity 110 can be made of steel, galvanized steel, stainless steel, aluminum, titanium, or any other metal. Alternatively, the fluid cavity 110 can be made of polyvinyl chloride (PVC), acrylonitrile butadiene styrene (ABS), polycarbonate, or any other plastic. The fluid cavity 110 can have a cross-section larger than several square centimeters. For example, the fluid cavity 110 can be a 3 inch duct having a cross-section of about 45 square centimeters. The fluid cavity 110 can be a 3 inch circular duct having a cross-section of about 45 square centimeters. The fluid cavity 110 can be a 6 foot by 6 foot rectangular duct having a cross-section of about 33300 square centimeters. Alternatively, the fluid cavity 110 can be a 0.25 inch circular duct having a cross-section of about 0.4 square centimeters. The fluid cavity 110 can be any shape and any size. In an illustrative embodiment, the fluid cavity 110 has a cross-section from about 25 square centimeters to about 900 square centimeters.

The acoustic transducer 120 can be a device that generates sound waves. For example, the acoustic transducer 120 can be a speaker, a loudspeaker, a magnetic inductive unit, a piezoelectric speaker, or any other sound generating device. The acoustic transducer 120 is acoustically associated with at least one portion 130 of the fluid cavity 110. Acoustically associated connotes that a first object and a second object are configured so that sound waves (i.e. acoustic energy) can be transmitted from the first object to and/or through the second object with minimal attenuation (e.g. about less than 50%). The portion 130 of the fluid cavity 110 can be a section of the fluid cavity 110. The portion 130 of the fluid cavity 110 can include a top, a bottom, a first side, and a second side associated with a length of the of the fluid cavity 110. For example, in a duct system including several hundred feet of 9"×16" ductwork, the portion 130 of the fluid cavity 110 can be a 3 foot section of the ductwork.

In one illustrative embodiment, the acoustic transducer 120 is directly attached to the portion 130 of the fluid cavity 110 such that sound generated by the acoustic transducer 120 is transmitted into the inside of the portion 130 of the fluid cavity 110. In another illustrative embodiment, the portion 130 of the fluid cavity 110 itself is part of the acoustic transducer 120. For instance, when a piezoelectric is attached to a heating duct, the material of the heating duct acts as a diaphragm of an acoustic transducer. Alternatively, an acoustic transducer can be built into a fluid cavity.

The acoustic transducer 120 can generate a single acoustic frequency or multiple acoustic frequencies in series or simultaneously. The frequencies can be selected to affect particular particles as discussed further below. The acoustic transducer 120 can also generate music. The music can be selected to include particular frequencies at particular power levels. For example, the frequency can be in a range from 0 Hz to 60 kHz and the power level can be in a range from 0 decibels to 200 decibels.

One or more acoustic transducers can be located along the portion 130 of the fluid cavity 110. For example, an acoustic transducer can be located on each side of a rectangular duct. In another example, acoustic transducers can be located around the outside of a circular duct. Each acoustic transducer can be designed for a different frequency range or the same frequency range or combinations thereof. In another illustrative embodiment, the entire fluid cavity 110 can be acoustically associated with one or more acoustic transducers.

The portion 130 of the fluid cavity 110 can be configured as a resonator. In one illustrative embodiment, the portion 130 of the fluid cavity 110 can be a quarter-wavelength resonator. A first side 140 of the portion 130 of the fluid cavity 110 and a second side 150 of the portion 130 of the fluid cavity 110 are located a quarter-wavelength ($\lambda/4$) apart from each other. The acoustic transducer 120 is located on the first side 140. Thus, when the acoustic transducer 120 forms an acoustic wave with wavelength $\lambda$, a quarter-wavelength standing wave 160 is formed in the portion 130 of the fluid cavity 110. The quarter-wavelength standing wave 160 includes a node 162 at the first side 140 and an antinode 166 at the second side 150. At node 162 acoustic power is at a minimum and at antinode 166 acoustic power is at a maximum.

In another illustrative embodiment, the portion 130 of the fluid cavity 110 can be a half-wavelength resonator. The first side 140 of the portion 130 of the fluid cavity 110 and the second side 150 of the portion 130 of the fluid cavity 110 are located a half-wavelength ($\lambda/2$) apart from each other. In the illustrated embodiment, the acoustic transducer 120 is located on the first side 140. Thus, when the acoustic transducer 120 forms an acoustic wave with wavelength $\lambda$, a half-wavelength standing wave 170 is formed in the portion 130 of the fluid cavity 110. The half-wavelength standing wave 170 includes nodes (172, 174) at the first side 140 and the second side 150 and an antinode 176 halfway between the first side 140 and the second side 150. At nodes (172, 174) acoustic power is at a minimum and at antinode 176 acoustic power is at a maximum.

Alternatively, the portion 130 of the fluid cavity 110 can be configured such that other fractional standing waves can be formed. The portion 130 of the fluid cavity 110 can be designed such that various areas of the portion 130 of the fluid cavity 110 can generate standing waves based on different wavelengths. In addition, the portion 130 of the fluid cavity 110 can be configured to generate two-dimensional standing waves. For example, a two-dimensional standing wave can be produced using a transducer for each dimension, a transducer in one dimension and a reflector in the other, or transient acoustic excitations that are three-dimensional and that are designed so that a traveling wave sequence generates two-dimensional or three-dimensional standing waves in concert with the resonance structure. Two-dimensional and three-dimensional standing waves can be generated and controlled using a computer adapted to control the transducers.

The fluid cavity 110 can direct, confine, or contain a fluid 180. The fluid 180 can be, for example, a gas or a liquid. The fluid 180 can be for heating, cooling, or moving a material dispersed within the fluid 180. In one illustrative embodiment, the gas can be ambient air, heated air, air-conditioned air, humidified air, or refrigerated air. In another illustrative embodiment, the gas can be an industrial gas, medical gas, or specialty gas such as purified nitrogen, oxygen, argon, or carbon dioxide. In one illustrative embodiment, the liquid can be a cooling liquid, a heating liquid, or a liquid for moving material such as water, glycol, or ammonia.

The fluid 180 contains particulate 185. The particulate 185 can include particles of various sizes, shapes, weight, density, and material. For instance, the particulate 185 can include, but is not limited to, nanoparticles, dust, bacteria, microbes, viruses, spores, molecules, or macromolecules. The particulate 185 can be any size but is typically about 0.01 to 10 microns in diameter. The particulate 185 can also be about 10 to 25 microns in diameter, or about 25 to 50 microns in diameter. Examples of particulate can include dust, dirt, and fly ash. Nanoparticles can be considered any particle from about 0.1 to 0.5 microns in diameter. Nanoparticles could also include any particle from about 0.5 to 1 microns in diameter, or about 1 to 5 microns in diameter. Examples of nanoparticles can include dust, dirt, waste from nanotechnology fabrication processes, particles produced as waste or as product from chemical reactions, chemicals, other airborne contaminants. In one illustrative embodiment, the fluid 180 flows along the direction of arrows 190.

When the acoustic transducer 120 is activated, an acoustic wave is generated. The acoustic transducer 120 can be activated manually by a switch, a detector, or by an automated control system. The acoustic wave can move the particulate 185 towards the second side 150. Thus, an acoustic force represented by arrow 195 is generated. The acoustic wave is selected to increase the concentration of the particulate 185 in a location in the fluid cavity 110. When the portion 130 of the fluid cavity 110 is a quarter-wavelength resonator, the location in the fluid cavity 110 is at the antinode 166 at the second side 150. Since the quarter-wave creates a node with energy maxima near or at the top of the chamber, the acoustic wave energy drives nanoparticles differentially to the top of the flow. When the portion 130 of the fluid cavity 110 is a half-wavelength resonator, the location in the fluid cavity 110 is at the antinode 176 in the middle of the fluid cavity 110. Using a resonance structure that allows half-wave resonance collects particles at the mid-point of the fluid cavity. Hence, various particle collection configurations are possible allowing for various particle collection points.

The acoustic force ($F_{ac}$) experienced by particles in the gas is proportional to the third power of the particle radius such that:

$$F_{ac} = 4\pi \varepsilon k R^3 \Phi(\beta, \rho) \sin(2ky)$$

$$\varepsilon = \frac{1}{2}\rho\left(u(x)^2 + \frac{p(x)^2}{(\rho c)^2}\right)$$

$$\Phi = \frac{\rho_p + \frac{2}{3}(\rho_p - \rho_f)}{2\rho_p + \rho_f} - \frac{c_f^2 \rho_f}{3c_p^2 \rho_p}$$

where R is the particle radius, $\rho_p$ is the particle density, $\Phi$ is the acoustic contrast, k is the wave number, $\varepsilon$ is the time averaged energy density of the acoustic wave, u(x) is the acoustic velocity field, p(x) is the pressure field, $c_p$ is the sonic velocity of the particle, $c_f$ is the sonic velocity of the fluid, and $\rho_f$ is the density of the fluid, In one illustrative embodiment, the radius of a nanoparticle (e.g., about a 10 nm radius) differs from the radius of a gas molecule (e.g., about a 100 Angstroms) by about two orders of magnitude. Since the force experienced by particles in the flow varies proportionally to the third power of their radii, this implies that, relative to a gas molecule, a nanoparticle experiences a force differential of over $10^6$. Thus the relatively large nanoparticles can be efficiently separated from the gas. The acoustic particle concentrator can operate on almost any carrier gas including, but not limited to, ambient air, heated air, air-conditioned air, humidified air, refrigerated air, industrial gas, medical gas, or specialty gas such as purified nitrogen, oxygen, argon, or carbon dioxide. Gas and nanoparticle radii usually differ by at least an order magnitude, ensuring a sufficient force differential. The acoustic power of the acoustic wave can be selected manually. In practice, the optimal acoustic power can depend on the efficiency of the resonance of the portion of the fluid cavity, particle concentration, etc.

The acoustic power of the acoustic wave can be, for example, in a range from 0 dB (1 mW) to 160 dB (10,000 W).

Advantageously, the particulate can be easily removed or re-directed thereby purifying the main fluid flow. For example, the particulate can be diverted to a collection point corresponding to a node or antinode as described above. At the collection point the particulate can be diverted to another duct or filtered. Advantageously, the acoustic particle concentrator is unobtrusive to the main fluid flow.

Figures 2, 3:
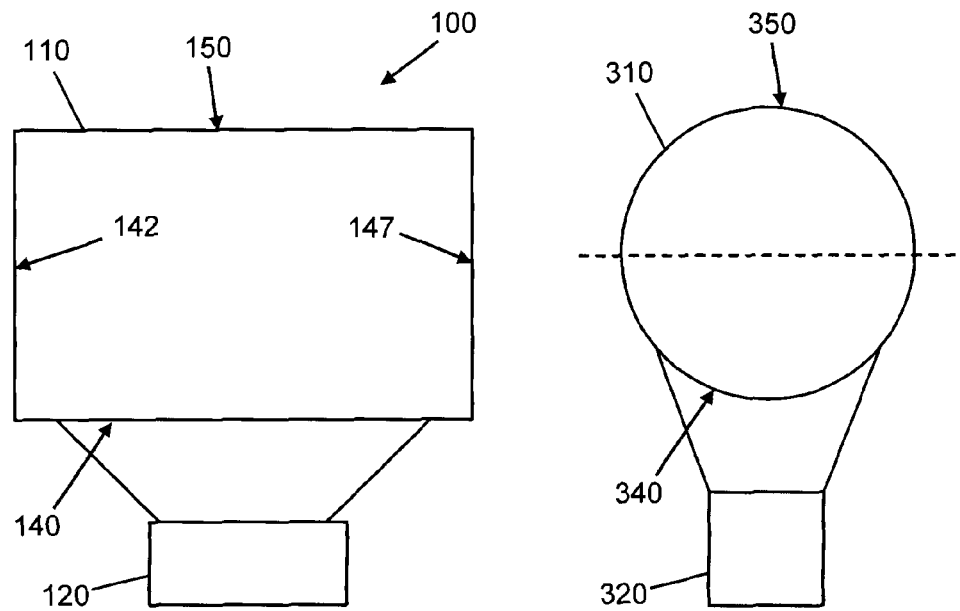
FIG. 2 is a schematic side view of the acoustic particle concentrator of FIG. 1 in is accordance with an illustrative embodiment.
FIG. 3 is a schematic side view of an acoustic particle concentrator with a circular cross-section in accordance with an illustrative embodiment.

Referring to FIG. 2, a schematic side view of the acoustic particle concentrator 100 of FIG. 1 in accordance with an illustrative embodiment is shown. The acoustic particle concentrator 100 includes the fluid cavity 110 and the acoustic transducer 120 as described above. The cross-section of the fluid cavity 110 can be a rectangular shape, however, any other shape is possible. The fluid cavity 110 can be defined by the first side 140, the second side 150, a third side 142, and a fourth side 147. The first side 140 can be opposite of the second side 150.

Referring to FIG. 3, a schematic side view of an acoustic particle concentrator with a circular cross-section in accordance with another illustrative embodiment is shown. The acoustic particle concentrator with a circular cross-section includes a fluid cavity 310 and an acoustic transducer 320 as described above. The cross-section of the fluid cavity 310 can be a circular shape, however, any other shape is possible. The fluid cavity 310 can be defined by a first side 340 and a second side 350.

Figure 4:
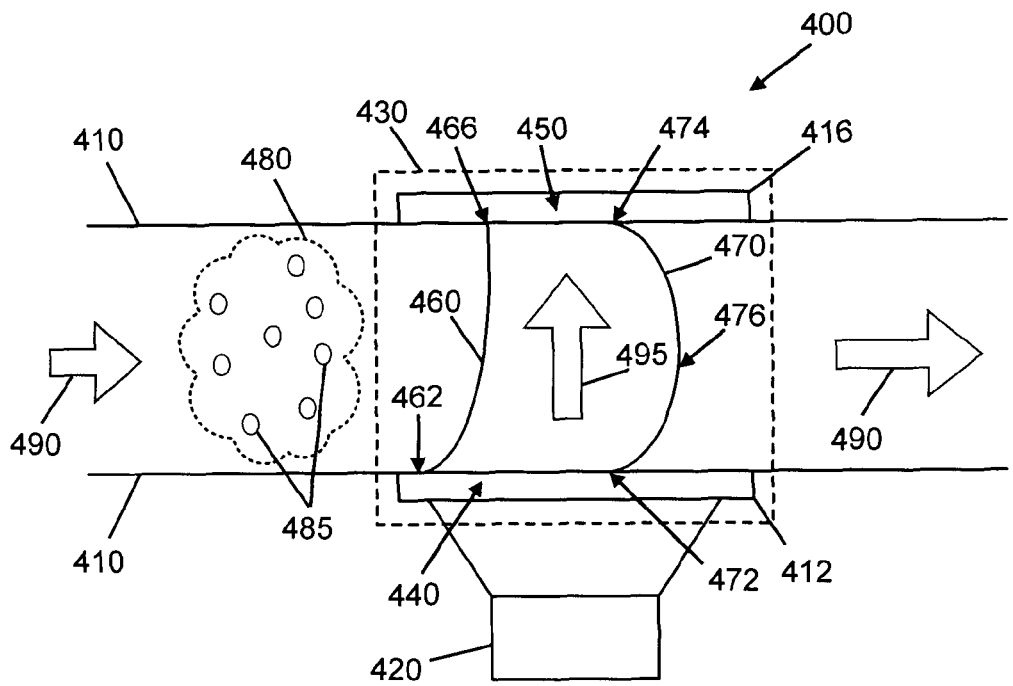
FIG. 4 is a schematic front view of an acoustic particle concentrator including impedance materials in accordance with an illustrative embodiment.
Figures 5, 6:
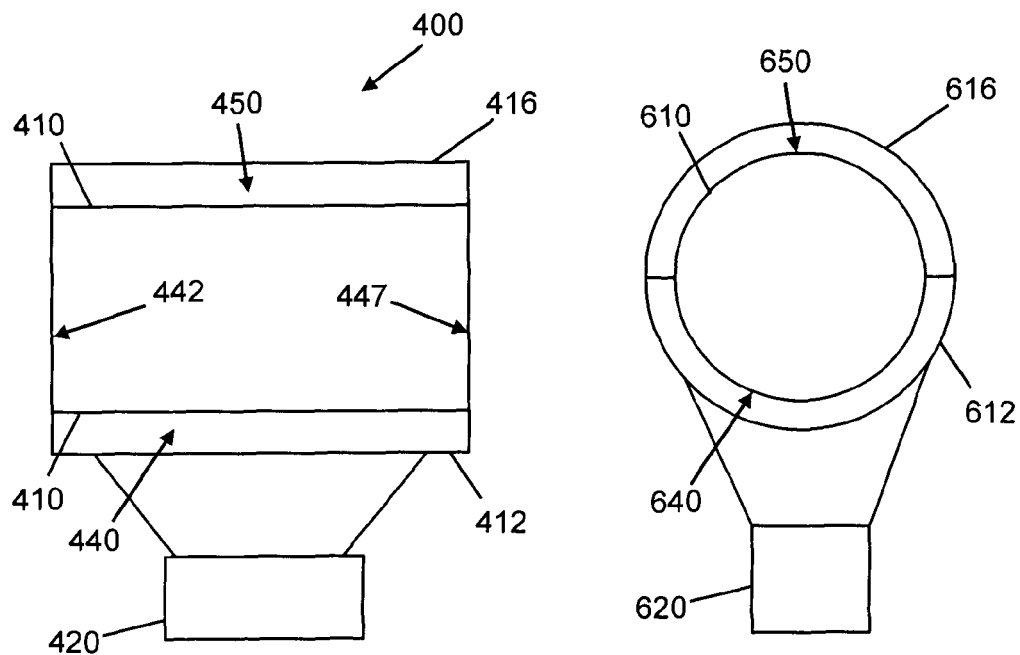
FIG. 5 is a schematic side view of the acoustic particle concentrator including impedance materials of FIG. 4 in accordance with an illustrative embodiment.
FIG. 6 is a schematic side view of an acoustic particle concentrator including impedance materials with a circular cross-section in accordance with an illustrative embodiment.

Referring to FIG. 4, a schematic front view of an acoustic particle concentrator including impedance materials 400 in accordance with still another illustrative embodiment is shown. The acoustic particle concentrator including impedance materials 400 includes a fluid cavity 410 and an acoustic transducer 420. The fluid cavity 410 can be a duct, a pipe, an enclosure, or a cyclone, as described above.

The acoustic transducer 420 can be a speaker, a loudspeaker, a magnetic inductive unit, a piezoelectric speaker, or any other sound generating device. The acoustic transducer 420 is acoustically associated with a portion of the fluid cavity 430. In one illustrative embodiment, the acoustic transducer 420 is directly attached to the fluid cavity 410 such that sound generated by the acoustic transducer 420 is transmitted into the inside of the portion 430 of the fluid cavity 410. The acoustic transducer 420 can be attached to the portion 430 of the fluid cavity 410 using screws, rivets, straps, adhesive, or any other kind of fastener. In another illustrative embodiment, the portion 430 of the fluid cavity 410 itself is part of the acoustic transducer 420. For instance, when a piezoelectric element is attached to a heating duct, the material of the heating duct acts as a diaphragm of an acoustic transducer. Alternatively, an acoustic transducer can be built into a fluid cavity.

The acoustic transducer 420 can generate a single acoustic frequency or multiple acoustic frequencies in series or simultaneously. The acoustic transducer 420 can also generate music. The music can be selected to include particular frequencies at particular power levels, as described further below.

One or more acoustic transducers can be located along the at least a portion 430 of the fluid cavity 410. For example, an acoustic transducer can be located on each side of a rectangular duct. In another example, acoustic transducers can be located around the outside of a circular duct. Each acoustic transducer can be designed for a different frequency range. In another illustrative embodiment, the entire fluid cavity 410 can be acoustically associated with an acoustic transducer.

The portion 430 of the fluid cavity 410 can be configured as a resonator. In one illustrative embodiment, the portion 430 of the fluid cavity 410 can be a quarter-wavelength resonator. A first side 440 of the portion 430 of the fluid cavity 410 and a second side 450 of the portion 430 of the fluid cavity 410 are located a quarter-wavelength ($\lambda/4$) apart from each other. The acoustic transducer 420 is located on the first side 440. Thus, when the acoustic transducer 420 forms an acoustic wave with wavelength ($\lambda$) a quarter-wavelength standing wave 460 is formed in the portion 430 of the fluid cavity 410. The quarter-wavelength standing wave 460 includes a node 462 at the first side 440 and an antinode 466 at the second side 450. At node 462 acoustic power is at a minimum and at antinode 466 acoustic power is at a maximum.

In another illustrative embodiment, the portion 430 of the fluid cavity 410 can be a half-wavelength resonator. The first side 440 of the portion 430 of the fluid cavity 410 and the second side 450 of the portion 430 of the fluid cavity 410 are located a half-wavelength ($\lambda/2$) apart from each other. The acoustic transducer 420 is located on the first side 440. Thus, when the acoustic transducer 420 forms an acoustic wave with wavelength ($\lambda$) a half-wavelength standing wave 470 is formed in the portion 430 of the fluid cavity 410. The half-wavelength standing wave 470 includes nodes (472, 474) at the first side 440 and the second side 450 and an antinode 476 halfway between the first side 440 and the second side 450. At nodes (472, 474) acoustic power is at a minimum and at antinode 476 acoustic power is at a maximum.

Alternatively, the portion 430 of the fluid cavity 410 can be configured such that other fractional standing waves can be formed. The portion 430 of the fluid cavity 410 can be designed such that various areas of the portion 430 of the fluid cavity 410 can form standing waves based on different wavelengths. In addition, the portion 430 of the fluid cavity 410 can be configured to form two-dimensional standing waves.

In addition, the portion 430 of the fluid cavity 410 can include acoustic impedance materials selected to enhance the production and effectiveness of acoustic waves generated by the acoustic transducer 420. The acoustic impedance of a material is determined by both the speed at which sound travels through the material and the amount of acoustic energy absorbed by the material. For example, foam has a high acoustic impedance since sound does not travel well through it and foam absorbs acoustic energy. Conversely, metal has a low acoustic impedance since sound travels well through it and metal tends transfer acoustic energy well.

The first side 440 can include an impedance matching material 412. The impedance matching material 412 allows acoustic waves generated by the acoustic transducer 420 to pass to the portion 430 of the fluid cavity 410 with minimal attenuation. The impedance matching material 412 can be a metal or any other material that transmits the acoustic wave with minimal attenuation, such as galvanized sheet metal. In one illustrative embodiment, the fluid cavity 410, itself, can be made of impedance matching material. In another illustrative embodiment, the impedance matching material can have a high speed of sound, i.e. greater than 343 meters per second.

The second side 450 can include a reflectance material 416. The reflectance material 416 allows acoustic waves generated by the acoustic transducer 420 to reflect off of the second side 450 and back into the fluid cavity 430 thereby promoting a standing wave. The reflectance material 416 can be any material; for example, materials such as cork, synthetic rubber, or buna rubber that result in a manageable thickness, as described below, can be used. The reflectance material 416 can have a low speed of sound, i.e. less than 343 meters per second. The thickness of the reflectance material 416 relative to the second side 450 is selected based on the wavelength of the selected acoustic wave as described further below.

When the acoustic transducer 420 forms an acoustic wave, the acoustic wave travels through the impedance matching material 412 at the first side 440 and into the fluid cavity 430. The acoustic wave travels through the portion 430 of the fluid cavity 410. When the acoustic wave reaches the second side 450, the reflectance material 416 reflects the acoustic wave back towards the first side 440 thereby creating a standing wave in the portion 430 of the fluid cavity 410.

The fluid cavity 410 can direct, confine, or contain a fluid 480. The fluid 480 can be, for example, a gas or a liquid. In one illustrative embodiment, the gas is ambient air. The fluid 480 contains particulate 485. The particulate 485 can include particles of various sizes, shapes, weight, density, or material. For instance, the particulate 485 can include nanoparticles, dust, bacteria, microbes, viruses, spores, molecules, or macromolecules. The particulate 485 can be any size but is typically about 0.01 to 10 microns in diameter. The particulate 485 can also be about 10 to 25 microns in diameter, or about 25 to 50 microns in diameter. Examples of particulate can include dust, dirt, and fly ash. Nanoparticles can be considered any particle from about 0.1 to 0.5 microns in diameter. Nanoparticles could also include any particle from about 0.5 to 1 microns in diameter, or about 1 to 5 microns in diameter. Examples of nanoparticles can include dust, dirt, and waste from nanotechnology fabrication processes. In one illustrative embodiment, the fluid 480 flows along the direction of arrows 490.

When the acoustic transducer 420 is activated, an acoustic wave generated. The acoustic transducer 420 can be activated manually by a switch, a detector, or by an automated control system. The acoustic wave can move the particulate 485 towards the second side. Thus, an acoustic force represented by arrow 495 is generated. The acoustic wave is selected to increase the concentration of the particulate 485 in a location in the fluid cavity 410. When the portion 430 of the fluid cavity 410 is a quarter-wavelength resonator, the location in the fluid cavity 410 is at the antinode 466 at the second side 450. Since the quarter-wave creates a node with energy maxima near or at the top of the chamber, the acoustic wave energy drives nanoparticles differentially to the top of the flow. When the portion 430 of the fluid cavity 410 is a half-wavelength resonator, the location in the fluid cavity 410 is at the antinode 476 in the middle of the fluid cavity 410. Using a resonance structure that allows half-wave resonance collects particles at the mid-point of the fluid cavity.

Referring to FIG. 5, a schematic side view of the acoustic particle concentrator including impedance materials 400 of FIG. 4 in accordance with an illustrative embodiment is shown. The acoustic particle concentrator including impedance materials 400 includes the fluid cavity 410 and the acoustic transducer 420 as described above. The cross-section of the fluid cavity 410 can be a rectangular shape, however, any other shape is possible. The fluid cavity 410 can be defined by the first side 440, the second side 450, a third side 442, and a fourth side 447. The first side 440 can be opposite of the second side 450. The first side 440 includes the impedance matching material 412. The second side 450 includes the reflectance material 416.

Referring to FIG. 6, a schematic side view of an acoustic particle concentrator including impedance materials with a circular cross-section in accordance with another illustrative embodiment is shown. The acoustic particle concentrator with a circular cross-section includes a fluid cavity 610 and an acoustic transducer 620 as described above. The cross-section of the fluid cavity 610 can be a circular shape, however, any other shape is possible. The fluid cavity 610 can be defined by a first side 640 and a second side 650. The first side 640 includes the impedance matching material 612. The second side 650 includes the reflectance material 616.

The acoustic particle concentrator including impedance materials can have a fluid cavity of a quarter wavelength and a reflector material thickness of a half wavelength (scaled for the proper speed of wave propagation within the reflector material) as follows:

$$\frac{c_r}{f} = 2t_r, \frac{c_g}{f} = 4t_g$$

where $c_r$ is the velocity of sound in the reflector, $c_g$ is the velocity of sound in the gas, f is the frequency of the acoustic wave, $t_r$ is the thickness of the reflector, and $t_g$ is the distance across the fluid cavity.

For example, consider a hypothetical ventilation duct with a height of 10 cm. The resonance structure could be built up around the duct and consist of a sound transducer, an impedance matching material (the steel of the duct), a fluid cavity (the inside of the duct), and a reflection material (cork) attached to the duct opposite of the sound transducer. In this case, the ventilation duct takes the place of the fluid cavity, implying a wavelength of 40 cm and a frequency of 858 Hz as follows:

$$v = \frac{v}{\lambda} = \frac{343 \text{ m/s}}{40 \times 10^{-2} \text{ m}} = 8.58 \times 10^2 \text{ Hz} = 0.858 \text{ kHz}$$

where $\upsilon$ is the quarter wavelength frequency, v is velocity of sound in the medium of the fluid cavity, and $\lambda$ is the wavelength associated with the quarter wavelength.

An effective reflector material has a speed of sound as close to or lower than the fluid (in this case, air) in the fluid cavity to minimize the reflector thickness. The speed of sound in corks and rubbers range from 150 m/s to 400 m/s. Using a cork with speed of sound at 300 m/s speed, gives a reflector made of cork a thickness of:

$$\frac{c_r}{f} = 2t_r \Rightarrow t_r = \frac{c_r}{2f} = \frac{300 \text{ m/s}}{2 \cdot 858 \text{ Hz}} = 17 \text{ cm.}$$

In contrast, using a material such as steel (with speed of sound of approximately 6,000 m/s) would increase the thickness of the reflector by a factor of about 20, making the reflector on the order of meters in thickness.

In this example, the duct itself serves as the impedance matching material (in many cases, the impedance matching medium can also be the containment of the fluid cavity), and a simple loudspeaker may be used since 858 Hz is within the audible range. Acoustic energy transference can be optimized by tight coupling of the components. For example, an acoustic transducer may be solidly affixed to a fluid cavity so that acoustic energy is transferred to the fluid cavity. In this case, nanoparticles are driven by the quarter wave resonance to the top of the ventilation stream, allowing for collection or diversion downstream. For example, a filter can be located in the top of the ventilation stream, downstream from the acoustic transducer. As the nanoparticles collect at the top of the ventilation stream, the filter skims the nanoparticles out of the ventilation stream.

At 858 Hz, the selected frequency of the acoustic wave is very close to an A flat/G sharp note. Thus, music with A flat/G sharp notes can be used to drive the acoustic transducer. For example, given the abnormal predominance of A flat/G sharp notes in "Dogs of War," the third song from the 1987 album, A Momentary Lapse of Reason by Pink Floyd, the song "Dogs of War" could drive resonance in the portion of the fluid cavity. Likewise, other songs can be used. Consequently, the acoustic particle concentrator can be used as part of a music system for a building, where the music is distributed via the building ductwork.

Figure 7:
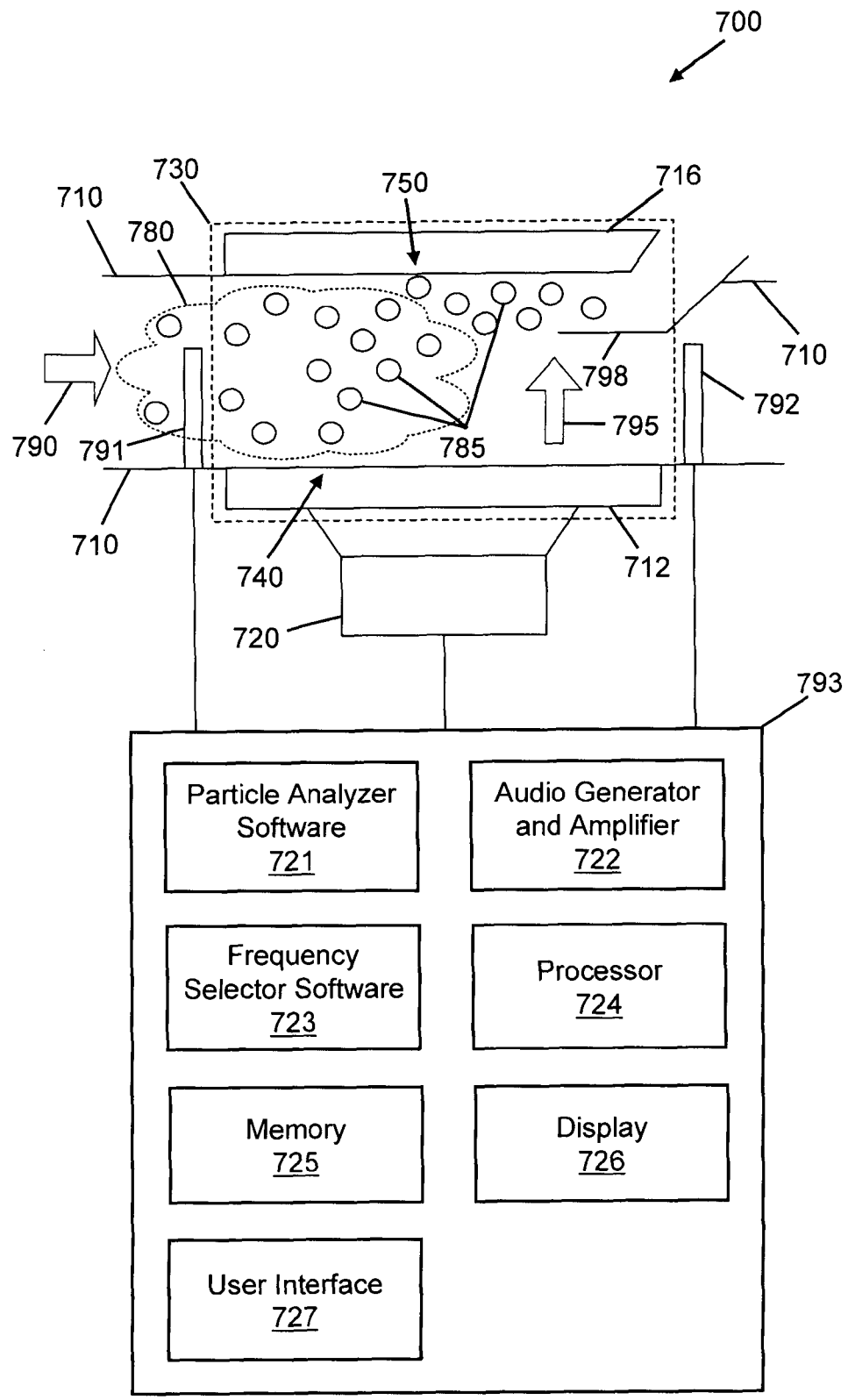
FIG. 7 is a schematic front view of an acoustic particle concentrator system in accordance with an illustrative embodiment.

Referring to FIG. 7, a schematic front view of an acoustic particle concentrator system 700 in accordance with an illustrative embodiment is shown. The acoustic particle concentrator system 700 includes a fluid cavity 710 and an acoustic transducer 720. The acoustic transducer 720 is acoustically associated with a portion of the fluid cavity 730. The fluid cavity 710 can be defined by a first side 740 and a second side 750. The first side 740 includes an impedance matching material 712. The second side 750 includes a reflectance material 716. The impedance matching material 712 and reflectance material 716 can be located along the portion of the fluid cavity 730 or the entire fluid cavity 710.

The fluid cavity 710 can direct, confine, or contain a fluid 780. The fluid 780 can be, for example, a gas or a liquid. In one illustrative embodiment, the gas is ambient air. The fluid 780 contains particulate 785. The particulate 785 can include particles of various sizes, shapes, weight, density, or material. For instance, the particulate 785 can include nanoparticles, dust, bacteria, microbes, viruses, spores, molecules, or macromolecules. The particulate 785 can be any size but is typically about 0.01 to 10 microns in diameter. The particulate 785 can also be about 10 to 25 microns in diameter, or about 25 to 50 microns in diameter. Examples of particulate can include dust, dirt, and fly ash. Nanoparticles can be considered any particle from about 0.1 to 0.5 microns in diameter. Nanoparticles could also include any particle from about 0.5 to 1 microns in diameter, or about 1 to 5 microns in diameter. Examples of nanoparticles can include dust, dirt, and waste from nanotechnology fabrication processes. In one illustrative embodiment, the fluid 780 can flow along the direction of arrow 790.

In one illustrative embodiment, the portion of the fluid cavity 730 is configured as a quarter-wave resonator as described above. A collector 798 can be located at an antinode of the quarter-wave resonator. For example, the collector 798 can be located on the second side 750 of the portion of the fluid cavity 730. The collector 798 can trap, filter, concentrate, reposition, divert and/or remove the particulate 785. For example, collector 798 can be a second fluid cavity or duct that diverts the particulate 785 by removing a portion of the fluid flow. The collector 798 can be positioned so that the concentrated particulate 785 can be culled, i.e., the collector 798 can be positioned in the stream of the particulate flow. The collector 798 can also include a filter and, optionally, the fluid diverted to the collector 798 can be later recombined with the fluid 780 in the fluid cavity 710. Alternatively, the acoustic wave can direct (i.e. push) the particulate into an opening located along the side of the fluid cavity 710. Alternatively, multiple collectors can be placed in various locations or stages within the portion of the fluid cavity 730. Each collector can be configured to collect a different kind, size, and/or density of particulate.

When the acoustic transducer 720 is activated, an acoustic wave is generated. The acoustic wave can move the particulate 785 towards the second side 750 where the collector 798 can be located. Thus, an acoustic force represented by arrow 795 is generated. The acoustic wave is selected to increase the concentration of the particulate 785 at the location of the collector 798 by moving the particulate 785 towards the collector 798.

The acoustic particle concentrator system 700 also optionally includes one or more of a first sensor 791, a second sensor 792, and a controller 793. The first sensor 791 and the second sensor 792 can measure the concentration of particulate 785 in the fluid 780. The first sensor 791 can be located at the intake to the portion of the fluid cavity 730 in order to measure the concentration of particulate 785 in the fluid 780 that is entering the portion of the fluid cavity 730. The second sensor 792 can be located at the exhaust of the portion of the fluid cavity 730 in order to measure the concentration of particulate 785 in the fluid 780 that is leaving the portion of the fluid cavity 730 so that particle separation effectiveness can be determined. The first sensor 791 and the second sensor 792 can be, for example, thermophoretic-type sensors; however, any particle concentration sensor can be employed. In addition, other sensors can be used to determine the temperature, velocity, and type of particulate 785 and fluid 780. Examples of other sensors include, but are not limited to, pitot tubes, thermometers, and spectrometers, reflectance detectors, scattering detectors, chemical detectors, electrical detectors, magnetic detectors, and/or nuclear sensors. Detection can be determined through electrochemical reactions, impedance methods, nuclear magnetic resonance (NMR), scintillation detections, etc.

The first sensor 791 and the second sensor 792 are communicatively coupled with the controller 793. The controller 793 controls the operation of the acoustic particle concentrator system 700. In particular, the controller 793 drives the acoustic transducer 720. The controller 793 can be a circuit, a programmable logic computer, a desktop computer, a laptop computer, or other type of computing device known to those of skill in the art. The controller 793 includes one or more of particle analyzer software 721, an audio generator and amplifier 722, frequency selector software 723, a processor 724, a memory 725, a display 726, and a user interface 727. In alternative embodiments, controller 793 may include fewer, additional, and/or different components. Memory 725, which can be any type of permanent or removable computer memory known to those of skill in the art, can be a computer-readable storage medium. Memory 725 is configured to store particle analyzer software 721, frequency selector software 723, an application configured to run particle analyzer software 721, an application configured to run frequency selector software 723, captured data from the first sensor 791 and the second sensor 792, and/or other information and applications as known to those of skill in the art. The controller 793 can also include a communication module to receive instructions, to control auxiliary devices, and to report data. Alternatively, the operation of the acoustic particle concentrator system 700 can be controlled via a cloud computing network.

Particle analyzer software 721 is configured to analyze data from the first sensor 791 and the second sensor 792. Particle analyzer software 721, which can be implemented as computer-readable instructions configured to be stored on memory 725, can analyze the data from the first sensor 791 to determine the components of the fluid 780. Processor 724, which can be in electrical communication with each of the components of controller 793, can be used to run the application and to execute the instructions of particle analyzer software 721. Any type of computer processor(s) known to those of skill in the art may be used. For example, the particle analyzer software 721 can determine the concentration of particulate 785 in the fluid 780 as well as the kinds of particulate 785 in the fluid 780. For example, the particle analyzer software 721 can determine the kind, density, weight, and kinetic energy of the constituents of particulate 785. In addition, the particle analyzer software 721 can determine what kind of gas is in the fluid cavity 710. The particle analyzer software 721 can also use data from the second sensor 792 to determine the effectiveness of the particle separation. Optionally, the effectiveness of the particle separation can be used as feedback to control the frequency or frequencies of the acoustic wave. Optionally, the detection of the presence of one or more particulates, or certain kinds of particulates, can be used as feedback to control the frequency or frequencies of the acoustic wave. In some embodiments, the feedback may indicate to turn on or off the acoustic wave.

Frequency selector software 723 is configured to select one or more frequencies to drive the acoustic transducer 720. Frequency selector software 723, which can be implemented as computer-readable instructions configured to be stored on memory 725, can determine the one or more frequencies of based on the properties of the portion of the fluid cavity 730 such as the height of the portion of the fluid cavity 730, the composition of the fluid 780, and the impedance matching material 712, and the reflectance material 716 as discussed above. Processor 724, which can be in electrical communication with each of the components of controller 793, can be used to run the application and to execute the instructions of frequency selector software 723. Any type of computer processor(s) known to those of skill in the art may be used.

In some embodiments, the frequency selector software 723 can select frequencies that target specific materials in the particulate 785. For example, the particulate 785 can include a first particulate and a second particulate where a first density of the first particulate is greater than a second density of the second particulate. The frequency selector software 723 can select a first frequency to increase the concentration of the first particulate in a first location in the fluid cavity, and a second frequency to increase the concentration of the second particulate in a second location in the fluid cavity based on the equation:

$$F_{ac} = 4\pi \epsilon k R^3 \Phi(\beta,\rho)\sin(2ky)$$

which is discussed above in detail. Thus, the first particulate and the second particulate can be directed to collectors in different parts of the portion of the fluid cavity 730. However, some selected frequencies may not fully resonate given the particular dimensions and materials of a particular fluid cavity. The frequency can be in a range of 1 Hz to about 5000 Hz; however, any frequency can be employed. The frequency selector software 723 can also select the acoustic power at which the frequency should be generated.

Alternatively, the frequency selector software 723 can select a frequency to target a specific kind of particulate. The frequency can then be used to calculate the ideal dimensions of a resonant structure as discussed above. The controller 793 can then direct the portion of the fluid cavity 730 to change shape. For instance, the second side 750 can be moved closer to or farther from the first side 740 thereby changing the resonant frequency of the portion of the fluid cavity 730.

The audio generator and amplifier 722 uses the one or more frequencies selected by the frequency selector software 723 to drive the acoustic transducer 720. The audio generator and amplifier 722 creates the selected frequency, amplifies the selected frequency, and drives the acoustic transducer 720. Alternatively, the audio generator and amplifier 722 can select a song that includes the one or more frequencies selected by the frequency selector software 723. For example, when the selected frequency is 858 Hz, the audio generator and amplifier 722 can drive the acoustic transducer 720 with "Dogs of War" by Pink Floyd.

When particle analyzer software 721 determines that the concentration of particulate 785 in the fluid 780 has surpassed a threshold, the particle analyzer software 721 can instruct the controller 793 to activate the audio generator and amplifier 722. Alternatively, the controller 793 can drive the acoustic transducer 720 continuously, intermittently, or on a timer. The acoustic transducer 720 can also be activated manually.

Display 726 can be used to display parameters of the acoustic particle concentrator system 700 such as the properties of the portion of the fluid cavity 730 including the height of the portion of the fluid cavity 730, the composition of the fluid 780, and the impedance matching material 712, and the reflectance material 716 as discussed above. Display 726 can be a liquid crystal display, a cathode ray tube display, or other type of display known to those of skill in the art.

User interface 727 allows a user to interact with controller 793 and to enter information into a user interface window. User interface 727 can include a mouse, a keyboard, a touch screen, a touch pad, etc. The user can use user interface 727 to enter or control the parameters of the acoustic particle concentrator system 700 such as the properties of the portion of the fluid cavity 730 including the height of the portion of the fluid cavity 730, the composition of the fluid 780, and the impedance matching material 712, and the reflectance material 716 as discussed above.

Figure 8:
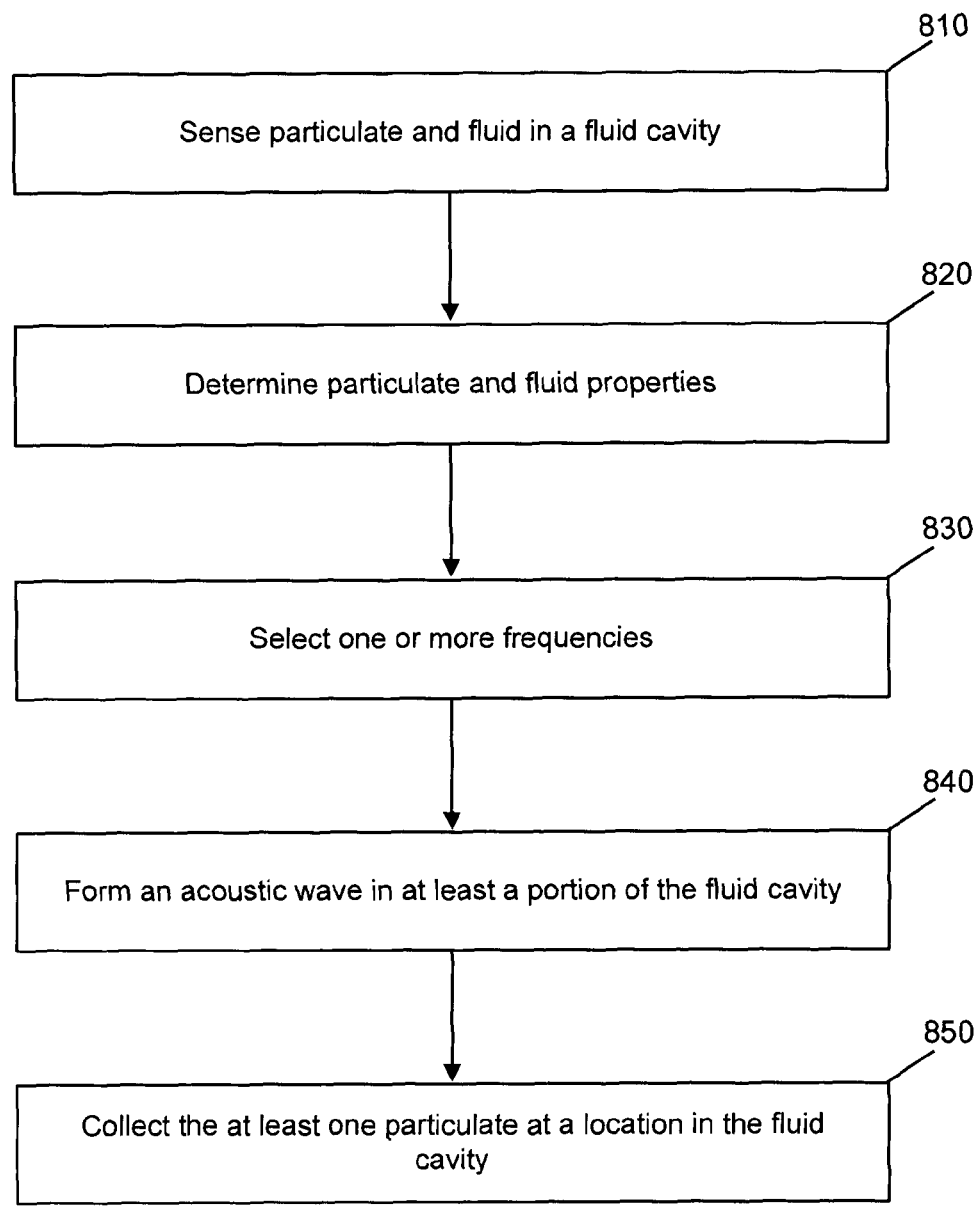
FIG. 8 is a flow diagram illustrating operations performed to concentrate particles acoustically in accordance with an illustrative embodiment.

Referring to FIG. 8, a flow diagram illustrating operations performed to concentrate particles acoustically in accordance with an illustrative embodiment is shown. In alternative embodiments, fewer, additional, and/or different operations may be performed. In an operation 810, particulate and fluid in a fluid cavity (e.g., 710) is sensed, for example, by a sensor (e.g., 791 or 792). The sensor can measure the concentration and other properties of particulate in a fluid in the fluid cavity. The sensor can also measure properties of the fluid.

In an operation 820, properties of the particulate and the fluid are determined. For example, a particle analyzer (e.g., 712) can determine the concentration of particulate as well as the kinds of particulate in the fluid in the fluid cavity. The particle analyzer can determine the kind, density, weight, and temperature of the constituents of particulate based on measurements from the sensor.

In an operation 830, one or more frequencies are selected. The frequency can be in a range of 1 Hz to about 5000 Hz or any audible frequency; however, any frequency can be selected. For example, a frequency selector (e.g., 723) can select one or more frequencies to drive an acoustic transducer (e.g., 720). The one or more frequencies can be selected based on the properties of a portion of the fluid cavity such as the height of the portion of the fluid cavity, the composition of the fluid, an impedance matching material of the portion of the fluid cavity, and a reflectance material of the portion of the fluid cavity as discussed above. In one illustrative, embodiment, the one or more frequencies can be selected, in part, to resonate in the fluid cavity. Alternatively, the one or more frequencies can be selected to target specific kinds of particulate.

In an operation 840, an acoustic wave can be formed in the portion of the fluid cavity. Alternatively, the acoustic wave can be formed in the entirety of the fluid cavity. The acoustic wave is formed based on the selected one or more frequencies. The fluid cavity can be configured as a resonator. Hence, the acoustic wave can resonate in the fluid cavity. The acoustic wave can concentrate particulate in the fluid cavity at a location in the fluid cavity. In one illustrative embodiment, the fluid cavity is a quarter-wave resonator. In another illustrative embodiment, the fluid cavity is a half-wave resonator. The location in the fluid cavity can be an antinode of a standing wave of the fluid cavity resonator. In another illustrative embodiment, a first particulate and a second particulate are concentrated in different locations of the fluid cavity by an acoustic wave including a first frequency and a second frequency.

In an operation 850, the particulate can be collected at the location in the fluid cavity. For example, a collector (e.g., 798) can be located at an antinode of a standing wave created by the acoustic wave in the fluid cavity resonator. The collector can trap, filter, divert and/or remove the particulate. Alternatively, multiple collectors can be placed in various locations or stages within the portion of the fluid cavity. Each collector can be configured to collect a different kind, size, and/or density of particulate.

Advantageously, unlike other methods that utilize vacuum or filtration to separate nanoparticles, the acoustic particle concentrator is relatively non-invasive, easy to build and run (with no moving parts), and takes advantage of a high separation potential based on the third power of the particle radii. Advantageously, the resonating structure of the acoustic particle concentrator can be built around existing or standard size exhausts systems, making is integration and installation mechanics simple.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An air cleaning system for removing particulates from an airstream, the system comprising:
    an air passage for conveying an airstream therethrough;
    a resonance structure disposed about at least a portion of the air passage;
    an acoustic transducer acoustically associated with the resonance structure to create a resonating acoustic wave in the airstream within the resonance structure, the resonating acoustic wave having at least one of an anti-node and a node, and at least one particulate in the airstream concentrates into a particulate stream at the at least one of the anti-node and the node;
    a collection device having a portion disposed at a location within the air passage to intercept the particulate stream to remove the at least one particulate from the airstream; and
    a frequency selector to adjust a frequency of the acoustic wave as a function of at least one of: composition of gas in the airstream and density of the at least one particulate in the airstream, to concentrate the at least one particulate into the particulate stream at the location of the portion of the collection device.

2. The system of claim 1, wherein the air passage has an intake into the air passage and an exit from the air passage, and the system further comprises:
    at least one first sensor located at the intake of the air passage for measuring the composition of gas in the airstream;
    at least one second sensor located at the intake of the air passage for measuring the density of the at least one particulate; and
    a controller communicatively coupled with the at least one first sensor and the at least one second sensor to select the frequency of the acoustic wave according to the composition of the gas in the airstream and the density of the at least one particulate.

3. The system of claim 2, wherein:
    the at least one particulate comprises a first particulate and a second particulate, and the at least one second sensor measures a first density of the first particulate and a second density of the second particulate;
    the controller is configured to select a first frequency to concentrate the first particulate into a first particulate stream in a first location in the air passage, and a second frequency to concentrate the second particulate into a second particulate stream in a second location in the air passage;
    the portion of the collection device disposed within the air passage is disposed at the first location to intercept the first particulate stream to remove the first particulate from the airstream; and
    the system further comprises an additional collection device having a portion disposed within the air passage at the second location to intercept the second particulate stream to remove the second particulate from the airstream.

4. The system of claim 1, wherein
the frequency selector is configured to adjust a frequency of the acoustic wave as a function of the composition of gas in the airstream and the density of the at least one particulate in the airstream, to concentrate the at least one particulate into the particulate stream at the location of the portion of the collection device.

5. The system of claim 1, wherein
the system further comprises a system for altering a shape of the resonance structure and air passage to move a location of the at least one of the node and the anti-node to the location of the portion of the collection device.

6. The system of claim 1, wherein the at least one particulate comprises nanoparticulates.

7. The system of claim 1, wherein the airstream has a cross-sectional area of at least about 0.4 cm$^2$.

8. The system of claim 1, wherein the frequency of the acoustic wave is in a range of 1 Hz to about 5000 Hz.

9. The system of claim 1, wherein the resonance structure comprises:
    an impedance matching material at one side of the air passage, and the acoustic transducer is disposed adjacent to the impedance matching material; and
    a reflection material at the other side of the air passage in opposition to the impedance matching material.

10. The system of claim 9, wherein:
    the impedance matching material is metal; and
    the reflection material comprises at least one of cork, rubber, and foam.

11. The system of claim 9, wherein the resonance structure defines one of:
a quarter-wave resonator, and the impedance matching material and the reflection material are located at opposite ends of the quarter-wave resonator; and
a half-wave resonator, and the impedance matching material and the reflection material are located at opposite ends of the half-wave resonator.

12. The system of claim 1, wherein:
the at least one particulate comprises nanoparticulates;
the air passage has a cross-sectional area of at least about 0.4 cm$^2$;
the air passage has an intake into the air passage and an exit from the air passage;
the frequency selector is configured to adjust a frequency of the acoustic wave as a function of the composition of gas in the airstream and density of the at least one particulate in the airstream, to concentrate the at least one particulate into the particulate stream at the location of the portion of the collection device; and
the system further comprises:
at least one first sensor located at the intake of the air passage for measuring the composition of gas in the airstream;
at least one second sensor located at the intake of the air passage for measuring the density of the at least one particulate; and
a controller communicatively coupled with the at least one first sensor and the at least one second sensor to select the frequency of the acoustic wave according to the composition of the gas in the airstream and the density of the at least one particulate, and the frequency of the acoustic wave is in a range of 1 Hz to about 5000 Hz.

13. A method for removing particulates from an airstream, the method comprising:
passing an airstream having particulates suspended therein through an air passage within a resonance structure;
forming an acoustic wave in the airstream in the resonance structure in a direction transverse to the flow of the airstream;
configuring the acoustic wave to resonate within the air passage in the resonance structure to create at least one of an anti-node and a node and concentrate at least one particulate into a particulate stream at the at least one of the anti-node and the node;
adjusting a frequency of the acoustic wave as a function of at least one of: a composition of gas in the airstream and a density of the at least one particulate in the airstream to concentrate the at least one particulate into the particulate stream at a collection location in the air passage; and
collecting the at least one particulate at the collection location in the air passage to remove the at least one particulate from the airstream.

14. The method of claim 13, wherein configuring the acoustic wave comprises altering a shape of the resonance structure to locate the at least one of the anti-node and the node at the collection location.

15. The method of claim 13, wherein configuring the acoustic wave comprises altering a frequency of the acoustic wave to locate the at least one of the anti-node and the node at the collection location.

16. The method of claim 13, wherein adjusting the frequency of the acoustic wave comprises adjusting the frequency as a function of the composition of gas in the airstream to concentrate the at least one particulate into the particulate stream at the collection location.

17. The method of claim 13, wherein adjusting the frequency of the acoustic wave comprises adjusting the frequency as a function of the density of the at least one particulate in the airstream to concentrate the at least one particulate into the particulate stream at the collection location.

18. The method of claim 13, wherein the at least one particulate comprises nanoparticulates, and the air passage has a cross-sectional area of at least about 0.4 cm$^2$.

19. The method of claim 13, wherein:
the resonance structure comprises an impedance matching material at one side of the air passage and a reflection material at the other side of the air passage in opposition to the impedance matching material; and
the resonance structure comprises an acoustic transducer disposed adjacent the impedance matching material for forming the acoustic wave.

20. The method of claim 19, further comprising configuring the resonance structure as one of:
a quarter-wave resonator with the impedance matching material and the reflection material located at opposite ends of the quarter-wave resonator; and
a half-wave resonator with the impedance matching material and the reflection material located at opposite ends of the half-wave resonator.

21. The method of claim 13, wherein configuring the acoustic wave comprises adjusting a frequency of the acoustic wave to a frequency in the range of 1 Hz to 5000 Hz.

22. The method of claim 13, further comprising:
sensing a threshold concentration of the at least one particulate in the airstream; and
turning on or turning off the acoustic wave as a function of the concentration.

23. A method for removing particulates from an airstream, the method comprising:
passing an airstream having particulates suspended therein through an air passage within a resonance structure, wherein the particulates comprises a first particulate having a first density and a second particulate having a second density, wherein the first density is different from the second density;
forming an acoustic wave in the airstream in the resonance structure in a direction transverse to the flow of the airstream;
configuring the acoustic wave to resonate within the air passage in the resonance structure to create at least one of an anti-node and a node, wherein the acoustic wave comprises a first frequency providing at least one of a first node and a first anti-node for concentrating the first particulate into a first particulate stream at a first location within the airstream, and a second frequency providing at least one of a second node and a second anti-node for concentrating the second particulate into a second particulate stream at a second location within the airstream different from the first location;
selecting one of the first frequency to concentrate the first particulate into the first particulate stream at the first location or the second frequency to concentrate the second particulate into the second particulate stream in the second location; and
removing at least one particulate from the airstream.

24. The method of claim 23, further comprising:
changing a resonant frequency of the resonance structure to position the node or anti-node corresponding to the selected frequency at a collection location in the air passage for removal of the corresponding one of the first particulate and the second particulate from the airstream at the collection location.

25. The method of claim 24, wherein the resonance structure comprises an impedance matching material at one side of the air passage and a reflection material at the other side of the air passage in opposition to the impedance matching material and changing the resonant frequency comprises moving the reflection material towards or away from the impedance matching material.

\* \* \* \* \*